United States Patent Office 3,459,529
Patented Aug. 5, 1969

3,459,529
UREA-BIURET CONDENSATION PRODUCTS AS SLOW RELEASE NITROGEN FERTILIZER AND THE PREPARATION THEREOF
Robert A. Wiesboeck, Atlanta, Ga., assignor, by mesne assignments, to USS Agri-Chemicals, Inc., Pittsburgh, Pa., a corporation of Delaware
No Drawing. Filed Apr. 26, 1966, Ser. No. 545,265
Int. Cl. C05c 9/00
U.S. Cl. 71—28
10 Claims

ABSTRACT OF THE DISCLOSURE

Bis(ureidomethylene)biuret or bis(biuretmethylene) biuret or dimethylenetribiuret which are useful as slow release nitrogen fertilizer are prepared by reacting dimethylolbiuret or dimethylolurea with urea or biuret at 20–90° C. and at a pH of 1–4.

---

This invention relates to slow release nitrogen fertilizer compounds and to the preparation thereof. More particularly, the invention relates to condensation products of urea, biuret, and formaldehyde.

Nearly all slow release nitrogen fertilizers on the market comprise urea-formaldehyde condensation products. Since the condensation reaction of urea with formaldehyde cannot be controlled very effectively, there is a formation of polymeric materials of high chain lengths which become unavailable, resulting in poor efficiency as fertilizer materials.

The key characteristic of the slowly available nitrogen in urea-formaldehyde products has been expressed as the "availability index of cold water-insoluble nitrogen." The analytical method for the "Nitrogen Activity Index (AI) of Urea-Formaldehyde Compounds" is given in the Official Methods of Analysis of the Association of Official Agricultural Chemists, Tenth Edition (1965), p. 19. The AI is calculated by the following equation:

Activity index (AI) = (percent CWIN −
          percent HWIN) × 100/percent CWIN where:

CWIN = cold water (25±2° C.) insoluble nitrogen
HWIN = hot water insoluble nitrogen An AI of 40 to 48 is usually deemed satisfactory for ureaform products; however, it is desirable that the AI be higher than 48 and preferably approaching 100. An inherent advantage of the higher AI values is that the nitrogen content, which is fixed or unavailable, is reduced proportionately as the AI value increases.

I have discovered that a slow release fertilizer similar to the urea-formaldehyde products can be produced which has a uniform molecular size and an AI very much higher than 48. The new compounds are produced by a two-step condensation reaction using urea nitrogen sources. The urea nitrogen sources may be defined as urea and biuret, which is a condensation product of urea.

A primary object, therefore, of the invention is to prepare new slow release nitrogen fertilizers having a high activity index and being of substantially uniform molecular size. A further object is to provide novel methods for the preparation of such fertilizers. Other specific objects and advantages will appear as the specification proceeds.

In illustrative embodiments of the invention, and depending on the combination of the N-materials, the following compounds can be prepared:

Bis(ureidomethylene)biuret (I), bis(biuretmethylene)urea (II), and dimethylenetribiuret (III).

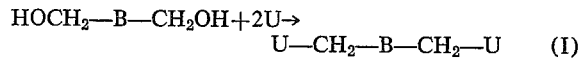
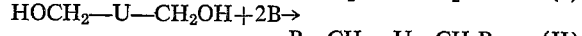
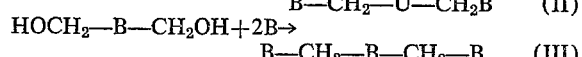

where:

B = biuret
U = urea

In the first step, formaldehyde is reacted with the urea nitrogen source, the term "urea nitrogen source" being understood to mean urea or its condensation product, biuret. The reaction is carried out in slightly alkaline solution forming the dimethylol derivative according to known procedures. When the formaldehyde is reacted with urea, the intermediate product is dimethylolurea. When the formaldehyde is reacted with biuret, the intermediate product is dimethylolbiuret. The intermediate is then condensed with an excess of biuret or urea in acid medium to give the products (I), (II) or (III) above. The condensation reaction is carried out at 20–90° C. and at a pH of 1–4. I prefer a temperature range of about 50–60° C. and a pH of 2.

It is advantageous to employ the reagent which is to be condensed with the dimethylol derivative at a 2 to 5-fold excess in order to avoid the formation of a chain polymer by the 1:1 reaction intermediate according to the following equation:

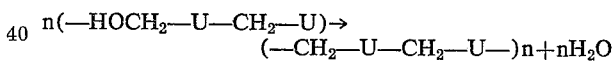

The desired products contain from 38 to 40% nitrogen and are characterized by a high cold water insoluble and a very low hot water insoluble nitrogen content.

The new products have activity indices of 70 and above and therefore provide substantial nitrogen availability over ureaforms. Higher nitrogen recoveries in the plant and longer green growth periods are indicated at application rates higher than one pound nitrogen per 1,000 square feet.

The foregoing products, as will be obvious to those skilled in the art, may be incorporated in mixed fertilizers containing supplemental rapidly-available nitrogen sources, conventional $P_2O_5$ and $K_2O$ sources, and other nutrient materials necessary for plant growth.

Specific examples illustrative of the invention may be set out as follows:

Example I.—Bis(ureidomethylene)biuret

The preparation of dimethylolbiuret is carried out by known procedures. I prefer to heat biuret in 37% formaldehyde at pH 8 for 30 minutes at 100° C.

The condensation with urea is achieved in acid medium, preferably at pH 2 and a temperature range of 20–90° C.

In a typical experiment, one mole of biuret (103 g.) is added to 2.2 moles of 37% aqueous formaldehyde (178 g.). The mixture is adjusted to pH 8 with 50% triethanolamine and heated to 100° C. for 30 minutes. A saturated aqueous solution of 3.0 moles of urea (180 g.) is added, which lowers the temperature to approximately 50° C. The resulting solution is acidified with a mineral acid to pH 1 while stirring rapidly. The temperature, which rises slightly on acidification, is maintained at 50° C. for one hour. The precipitation of the product is essentially complete after storage for three hours at room temperature.

The insoluble material is separated by filtration, washed with cold water until neutral, and dried at 60–100° C. The product melts at 224–230° C. with decomposition. Product analysis is as follows:

|   | Percent |
|---|---|
| Total N | 39.7 |
| CWIN | 24.1 |
| HWIN | 3.7 |
| AI | 84.8 |

Example II.—Bis(biuretmethylene)urea

One mole of dimethylolurea (120 g.) and three moles of biuret (309 g.) are dissolved in 1.5 liters of water at 90° C. Insoluble impurities are filtered off and the filtrate acidified to pH 3 with phosphoric acid at 70° C. The reaction mixture is maintained at 70° C. for one hour and is then stored at ambient temperature for 24 hours. The precipitate is filtered off, washed with hot ethanol to remove free biuret, and dried at 60–80° C. The product decomposes at 238–240° C. Product analysis is:

|   | Percent |
|---|---|
| Total N | 38.2 |
| CWIN | 25.6 |
| HWIN | 7.3 |
| AI | 71.5 |

Example III.—Dimethylenetribiuret

A solution of one mole of dimethylolbiuret is prepared as described in Example I and warmed to 90° C. To this is added 3 moles of biuret (309 g.) dissolved in 1.5 liters of 90° C. water. After acidification to pH 3, the reaction mix is stored for one hour at 70° C. and for 24 hours at ambient temperature. The precipitate is washed free of biuret with hot ethanol. Drying at 60–80° C. produces 270 g. of a white sandy powder with the following analysis:

|   | Percent |
|---|---|
| Total N | 38.0 |
| CWIN | 30.0 |
| HWIN | 8.7 |
| AI | 70.0 |

Example IV

A growth response of rye grass to product (I), bis(ureidomethylene)biuret, and product (II), bis(biuretmethylene)urea, is demonstrated in Table I:

TABLE I.—AVERAGE YIELDS OF AIR-DRIED MATERIAL

| Crop No. | Yield, g. | | |
|---|---|---|---|
|   | No N | N from (I) | N from (II) |
| 1 | 0.48 | 0.47 | 0.45 |
| 2 | 0.48 | 0.48 | 0.45 |
| 3 | 0.30 | 0.42 | 0.32 |
| 4 | 0.22 | 0.43 | 0.35 |
| 5 | 0.17 | 0.42 | 0.32 |
| 6 | 0.11 | 0.25 | 0.18 |
| 7 | 0.08 | 0.13 | 0.12 |
| 8 | 0.03 | 0.10 | 0.07 |
| Total | 1.87 | 2.70 | 2.16 |

While in the foregoing specification I have set forth specific steps of procedure in considerable detail for the purpose of illustrating embodiments of the invention, it will be understood that such details may be varied widely by those skilled in the art without departing from the spirit of my invention.

I claim:
1. The compound bis(ureidomethylene)biuret.
2. The compound bis(biuretmethylene)urea.
3. The compound dimethylenetribiuret.
4. A process for the preparation of bis(ureidomethylene)biuret which comprises reacting an excess of urea sufficient to prevent formation of a chain polymer with dimethylolbiuret at a temperature of about 20–90° C. and a pH of 1–4.
5. A process for the preparation of bis(biuretmethylene)urea which comprises reacting an excess of biuret sufficient to prevent formation of a chain polymer with dimethylolurea at a temperature of about 20–90° C. and a pH of 1–4.
6. A process for the preparation of dimethylenetribiuret which comprises reacting an excess of biuret sufficient to prevent formation of a chain polymer with dimethylolbiuret at a temperature of about 20–90° C. and a pH of 1–4.
7. The process of claim 4 wherein said temperature is in the range of about 50–60° C. and said pH is about 2.
8. The process of claim 5 wherein said temperature is in the range of about 50–60° C. and said pH is about 2.
9. The process of claim 6 wherein said temperature is in the range of about 50–60° C. and said pH is about 2.
10. A method of fertilizing the soil which comprises applying to said soil bis(ureidomethylene)biuret, bis(biuretmethylene)urea or dimethylenetribiuret.

References Cited

UNITED STATES PATENTS

| 2,378,110 | 6/1945 | Simons et al. |   |
|---|---|---|---|
| 2,592,809 | 4/1952 | Kralovec et al. | 71—28 |
| 2,729,611 | 1/1956 | Chesley et al. | 71—28 |
| 2,625,524 | 1/1953 | Kvalnes | 260—553 |

S. LEON BASHORE, Primary Examiner

T. G. FERRIS, Assistant Examiner

U.S. Cl. X.R.

71—30; 260—553